United States Patent [19]

Beck et al.

[11] Patent Number: 4,962,131

[45] Date of Patent: Oct. 9, 1990

[54] COMPOSITION USEFUL IN PROCESS FOR PREPARING POWADIR MEMBRANES FROM TETRAHALOBISPHENOL A POLYCARBONATES

[75] Inventors: Henry N. Beck, Walnut Creek; Edgar S. Sanders, Jr., Pittsburg; G. Glenn Lipscomb, II, Walnut Creek, all of Calif.

[73] Assignee: The Dow Chemical Company, Midland, Mich.

[21] Appl. No.: 118,141

[22] Filed: Nov. 6, 1987

[51] Int. Cl.$^5$ ............................................. C08L 69/00
[52] U.S. Cl. ...................................... 521/51; 521/64; 521/85; 521/87; 521/88; 521/89; 521/90; 521/94; 521/97; 521/95; 521/98; 521/180; 524/611
[58] Field of Search ....................... 521/64, 51, 85, 87, 521/88, 89, 90, 94, 97, 95, 98, 180; 524/611

[56] References Cited

U.S. PATENT DOCUMENTS

| | | | |
|---|---|---|---|
| 3,256,675 | 6/1966 | Robb | 55/16 |
| 3,615,024 | 10/1971 | Michaels | 210/490 |
| 3,709,774 | 1/1973 | Kimura | 161/159 |
| 3,945,926 | 3/1976 | Kesting | 210/500 |
| 4,032,309 | 6/1977 | Salemme | 55/158 |
| 4,048,271 | 9/1977 | Kesting | 264/41 |
| 4,075,108 | 2/1978 | Higley et al. | 210/500 |
| 4,086,310 | 4/1978 | Bottenbruch et al. | 264/41 |
| 4,374,891 | 2/1983 | Ward | 428/220 |
| 4,772,392 | 11/1987 | Sanders, Jr. et al. | 210/500.23 |
| 4,818,254 | 4/1989 | Anand | 55/306 |

FOREIGN PATENT DOCUMENTS

| | | |
|---|---|---|
| 0242147 | 10/1987 | European Pat. Off. . |
| 53-16373 | 3/1978 | Japan . |
| 59-120206A | 5/1982 | Japan . |
| 58-223411A | 5/1982 | Japan . |
| 58-008511 | 4/1983 | Japan . |
| 59-22724 | 1/1984 | Japan . |
| 62-006909A | 1/1985 | Japan . |
| 1507921 | 3/1975 | United Kingdom . |
| 2011804A | 7/1979 | United Kingdom . |

OTHER PUBLICATIONS

Muruganandam, University of Texas at Austin, Paper entitled "Absorption and Transport in Substituted Polycarbonates and Polystyrene/Tetramethyl Polycarbonate Blends", 10/28-29/85.

Chern et al., Chapter 2, "Material Selection for Membrane Based Gas Separations", *Material Science of Synthetic Membranes*, Lloyd, Ed., pp. 25-46, American Chemical Society (1985).

*Primary Examiner*—C. Warren Ivy

[57] ABSTRACT

The invention is a composition useful for the preparation of POWADIR membranes of a bisphenol-based polycarbonate wherein at least 25 percent by weight of the bisphenol moieties are tetrahalogenated, wherein the halogen is Cl or Br, the composition comprising (i) a bisphenol-based polycarbonate wherein at least 25 percent by weight of the bisphenol moieties are tetrahalogenated, wherein the halogen is Cl or Br, (ii) a solvent for such polycarbonate, and (iii) a non-solvent for such polycarbonate. The composition is useful for extruding membranes wherein the membranes formed are POWADIR membranes with a discriminating region capable of separating oxygen from nitrogen.

The composition of this invention allows the formation of membranes with excellent physical properties, good separation factors for oxygen and nitrogen, with excellent fluxes.

22 Claims, No Drawings

COMPOSITION USEFUL IN PROCESS FOR PREPARING POWADIR MEMBRANES FROM TETRAHALOBISPHENOL A POLYCARBONATES

BACKGROUND OF THE INVENTION

This invention relates to a composition useful in a process for the preparation of membranes comprising bisphenol polycarbonates wherein at least 25 percent by weight of the bisphenol moieties are tetrahalogenated wherein the halogen is Cl or Br, or a mixture, thereof. More particularly, this composition is the mixture used as feed to a process for the preparation of such membranes.

In various industries, it is necessary or highly desirable to separate one component from another in a gaseous stream. Processes used to perform such separations include pressure swing absorption, cryogenics, and membrane separations. In a membrane separation, a gaseous stream containing the components to be separated is contacted with a membrane, wherein the membrane separates two regions in a manner such that only those materials which permeate through the membrane can communicate from one region to the other. Such membranes are semi-permeable, in that one component of the gaseous mixture selectively permeates through the membrane at a rate much higher than one or more of the components in the gaseous stream. The gaseous mixture is contacted with the membrane in a manner such that the selectively permeable species is preferentially transported through the membrane to the other region. It is to be noted that the component from which the selectively permeable species is to be separated may in fact permeate through the membrane at a much slower rate than the selectively permeable species. It is this difference in rates of permeation which is used to separate the gaseous species or reduce the concentration of the less selectively permeated species in the region to which the permeating gases permeate.

In such separations, the relative rate of permeation, that is, the difference in rate of permeation between the selectively permeating gas and the non-selectively permeating gas, is a major factor in the separation achieved. The higher the ratio of permeation of the selectively permeable gas over the non-selectively permeable gas, the better the membrane will perform. Therefore, it is desirable to have as high a ratio as possible.

Presently, membranes derived from acetate esters, for example cellulose acetate, cellulose diacetate, and cellulose triacetate, polyamides, polyimides, and olefins, for example polyethylene, polypropylene, poly-4-methylpentene-1, are used for gas separations. Among such separations are the separation of oxygen from nitrogen, and carbon dioxide from methane.

Some of the materials used in membranes suffer from certain disadvantages. One such problem is the inability to perform under extreme conditions, such as high temperatures and pressures. As a result, certain separations are limited by the membrane as to the temperatures and pressures which may be used.

Another important property of membranes is the permeability of the gases through the membrane. If the permeability is too low, the membrane may not provide enough flow through the membrane to be economical for separations. Some potential candidates for membrane separations provide good separation factors but low permeabilities for dense membranes. One technique used to improve the flow is to form asymmetric membranes from such polymers. Asymmetric membranes comprise a membrane with a thin, dense region wherein the separation is effected, and a larger region which is porous through which gases pass with little resistance which provides support for the thin, dense layer. The formation of an asymmetric membrane with good separation factors and permeabilities is a difficult chemistry and engineering problem.

Asymmetric membranes are formed by forming a mixture of the material from which the membrane is to be formed, a solvent for such material, and optionally a non-solvent for such material. The mixture is exposed to conditions wherein the membrane forming material and the solvent and non-solvent phase separate leaving the formed membrane with an asymmetric structure. The structure of the formed membrane is affected by the nature of the solvent, any non-solvent used, the membrane forming material content of the mixture, and where a non-solvent is used the ratio of the solvent to the non-solvent. In addition, the process conditions have a significant effect on the membrane structure.

Recently it has been discovered that bisphenol-based polycarbonates wherein at least 25 percent by weight of the bisphenol moieties are tetrahalogenated, wherein the halogen is Cl or Br, exhibit excellent separation factors for the separation of oxygen from nitrogen, but exhibit low flux in the dense form. Furthermore, such polycarbonates exhibit excellent physical properties.

What are needed are membranes of bisphenol-based polycarbonates wherein at least 25 percent by weight of the bisphenol moieties are tetrahalogenated, wherein the halogen is Cl or Br, wherein the flux is increased significantly over those of a dense membrane of such material. What is further needed is a process which allows the preparation of such membranes from such polycarbonates. What is further needed is a composition which is useful in the preparation of such membranes from such polycarbonates.

SUMMARY OF THE INVENTION

The invention is a composition useful for the preparation of POWADIR membranes of a bisphenol-based polycarbonate wherein at least 25 percent by weight of the bisphenol moieties are tetrahalogenated, wherein the halogen is Cl or Br, the composition comprising (i) a bisphenol-based polycarbonate wherein at least 25 percent by weight of the bisphenol moieties are tetrahalogenated, wherein the halogen is Cl or Br, (ii) a solvent for such polycarbonate, and (iii) a non-solvent for such polycarbonate. The composition is useful for extruding membranes wherein the membranes formed are POWADIR membranes with a discriminating region capable of separating oxygen from nitrogen.

The composition of this invention allows the formation of membranes with excellent physical properties, good separation factors for oxygen and nitrogen, with excellent fluxes.

DETAILED DESCRIPTION OF THE INVENTION

The polycarbonates useful in this invention are polycarbonates derived from bisphenols wherein a significant portion of the bisphenols used to prepare the polycarbonates are tetrahalo-substituted, more preferably the tetrahalo substituents are found in the 3,5- positions on the aromatic or phenolic rings. The presence of a significant portion of the residue of tetrahalo bisphenols enhance the properties of membranes that are prepared therefrom. More particularly, such membranes have enhanced separation factors with respect to oxygen/nitrogen, hydrogen/methane, and carbon dioxide/methane separations.

Preferably the polycarbonates useful in this invention comprise polymers with backbone units which correspond to the formula

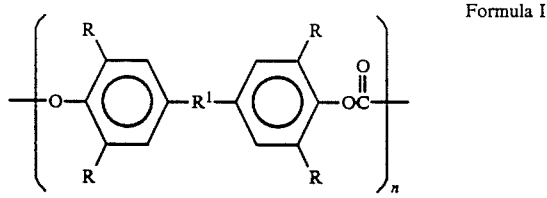

Formula I wherein R at each occurrence is independently H, Cl, Br, or $C_1$–$C_4$ alkyl; and, $R^1$ is carbonyl, —S—, —$SO_2$—, —O—, or a $C_1$–$C_6$ divalent hydrocarbon, a $C_1$–$C_6$ divalent halocarbon radical, or an inertly substituted $C_1$–$C_6$ hydrocarbon radical, with the proviso that at least 25 weight percent of the bisphenol moieties present bear R groups which are exclusively Br, Cl, or mixtures thereof.

Preferably, at least 35 weight percent of the bisphenol moieties in the polycarbonate backbone bear R groups which are exclusively bromine, chlorine, or mixtures thereof. More preferably, at least 50 weight percent of the bisphenol moieties in the backbone bear R groups which are exclusively bromine, chlorine, or mixtures thereof. Even more preferably, at least 75 weight percent of the bisphenol moieties in the polycarbonate backbone bear R groups which are exclusively bromine, chlorine, or mixtures thereof. Even more preferably, the polycarbonate is derived from bisphenols where R is exclusively bromine, chlorine, or mixtures thereof. In the embodiment wherein the polycarbonate is prepared from tetrachlorobisphenols, it is preferable that the polycarbonate backbone contain about 90 percent by weight or greater units derived from tetrachloro-bisphenols, more preferably 95 percent by weight, and most preferably 100 percent by weight. Bromine is the preferred halogen herein. Examples of preferred bisphenols which bear R groups which are exclusively Br or Cl are 2,2-bis(3,5-bromo-4-hydroxyphenyl)propane and 2,2-bis(3,5-chloro-4-hydroxyphenyl)propane with 2,2-bis(3,5-bromo-4-hydroxyphenyl)propane being most preferred. Preferably, those R groups which are not halogen are methyl or hydrogen, and most preferably hydrogen.

In the hereinbefore presented formulas, R is preferably chlorine, bromine, hydrogen or $C_{1-4}$ alkyl, more preferably chlorine, bromine, hydrogen, or methyl, even more preferably chlorine and bromine, and most preferably bromine. $R^1$ is preferably a $C_{1-6}$ divalent hydrocarbon, more preferably a $C_{1-6}$ alkylidene radical, even more preferably an isopropylidene radical.

The polycarbonates of this invention can be prepared by any process known in the art which prepares polycarbonates with suitable properties for membrane formation. See *Encyclopedia of Polymer Science & Technology*, Editor Mark et al., Interscience Division of John Wiley & Sons, New York, N.Y., 1969, Vol. 10, pp. 714–725 (relevant portions incorporated herein by reference). The polymers useful in this invention should be polymerized to the extent that the polymers will form a membrane with sufficient mechanical strength to withstand use conditions.

The solvent functions to dissolve the polymer and the non-solvent into a homogeneous solution at the temperatures used for extrusion so that the mixture may be extruded. The non-solvent functions to aid in the formation of pores in the polymer when it undergoes phase separation in the quench zone.

An optional fourth component, a dissolving medium, may be added to the polymer mixture to aid in the formation of a homogeneous mixture. The dissolving medium is used to enhance the dissolution of the polymer into the solvent/non-solvent mixture. Usually the dissolving medium is removed from the mixture prior to the extrusion, usually by flashing it off.

The solvent may be any solvent for the polycarbonate, which dissolves enough of the polycarbonate so as to form a solution viscous enough to be extrudable at the extrusion temperatures. The amount of solvent used depends upon the polymer used, the non-solvent used, the desired properties of the membrane, and the method of quenching the fiber.

Examples of preferred solvents for the polycarbonate include a glycol ether which corresponds to the formula $R^3O$-$(CH_2CH_2O)_r$-$R^3$ wherein $R^3$ is methyl or ethyl, and r is an integer of between about 1 and 20; a dialkyl ketone wherein the alkyl groups independently are methyl or ethyl; morpholine substituted on the nitrogen atom with an alkyl, formyl or alkanoyl moiety; unsubstituted or N-$C_{1-4}$ alkyl, N-$C_{5-6}$ cycloalkyl, or N-$C_{6-10}$ aryl or alkaryl substituted pyrrolidinone; $C_{1-4}$ alkoxycarbonyl, formyl, nitro, or halo-substituted benzene; tetrahydrofuran; dimethyl formamide, cyclohexanone; N,N-dimethyl acetamide, acetophenone; caprolactone; methylene chloride; sulfolane; cyclohexyl acetate; 1,1,3,3-tetramethylurea; isophorone; 1-formylpiperidine; methyl salicylate; hexamethyl-phosphoramide; phenyl ether; or bromonaphthalene.

The glycol ethers useful as a solvent for the polycarbonate corresponds to the formula $R^3O$-$(CH_2CH_2O)_r$-$R^3$ wherein $R^3$ is methyl or ethyl, and r is an integer of between about 1 and 20. Preferably, r is an integer of between about 1 and about 10, and even more preferably between about 1 and about 4, most preferably when methyl r is between about 1 and about 4, and when $R^3$ is ethyl r is between about 2 and about 4. Examples of such glycol ethers include ethylene glycol dimethyl ether, diethylene glycol dimethyl ether, and bis (2-methoxyethyl ether). Preferred dialkyl ketones useful as a solvents for the polycarbonates include dimethyl ketone, diethyl ketone, and methyl ethyl ketone. Preferred substituted morpholines are those with a $C_{1-10}$ alkyl, formyl or $C_{1-10}$ alkanoyl moiety substituted on the nitrogen atom; more preferred are those with a $C_{1-4}$ alkyl, formyl or $C_{1-4}$ alkanoyl moiety substituted on the nitrogen atom. Examples of substituted morpholines include N-formylmorpholine, and N-ethylmorpholine. Preferred pyrrolidinones useful as solvents include pyrrolidinone, N-methyl pyrrolidinone, N-ethyl pyrrolidinone, N-cyclohexyl pyrroldinone, N-benzyl pyrroldinone, and N-phenyl pyrrolidinone; with N-methyl pyrrolidinone, and N-ethyl pyrrolidinone more preferred; and N-methyl pyrrolidinone most preferred. The term pyrrolidinone as used herein refers to compounds named as pyrrolidinones and pyrrolidones. Preferred substituted benzenes useful as solvents for the polycarbonates correspond to the formula

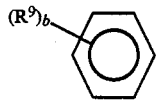

wherein $R^9$ is $C_{1-4}$ alkoxycarbonyl, nitro, halo or a formyl moiety; and b is an integer of about 1 to about 6, with the proviso that wherein $R^9$ is alkoxycarbonyl b is 1. The preferred halogens are chlorine and bromine, with chlorine most preferred. Preferably, b is between about 1 and 3. Examples of substituted benzenes useful as solvents include chlorobenzene, dichlorobenzene, benzaldehyde, nitrobenzene, ethyl benzoate, methyl benzoate, and 1,2,4-trichlorobenzene.

Preferred solvents comprise N-methylpyrrolidinone, tetrahydrofuran, ethylene glycol dimethylether, diethylketone, N-ethylmorpholine, dimethylformamide, cyclohexanone, bis(2-methoxyethylether), N,N-dimethylacetamide, acetophenone, methylene chloride, or sulfolane. More preferred solvents include N-methylpyrrolidinone, ethylene glycol dimethylether, tetrahydrofuran, diethylene glycol dimethylether, acetophenone, methylene chloride, or cyclohexanone. The most preferred solvent is N-methyl pyrrolidinone.

The non-solvent may be any compound which does not substantially dissolve the polycarbonate at extrusion temperatures, is suitable in the solvent for the polycarbonate, which aids in the formation of pores in the polymer rich phase when the spin mixture is extruded into a quench zone. Generally compounds which dissolve less than five percent by weight of the polycarbonate are preferable non-solvents. The amount of non-solvent used depends upon the polymer used, the solvent used, the desired properties of the membrane, and the method of quenching the fiber.

Examples of preferred non-solvents for the polycarbonate include a glycol or glycol ether which corresponds to the formula $R^4O-(CH_2CH_2O)_q-R^4$ wherein $R^4$ is independently in each occurrence hydrogen or $C_{1-4}$ alkyl, and q is an integer or about 1 to about 250; an ester corresponding to the formula $R^5COOR^6$ wherein $R^5$ is hydrogen or $C_{1-19}$ alkyl, and $R^6$ is $C_{1-10}$ alkyl; a $C_{1-10}$ alkanol; cyclohexane, unsubstituted or substituted with an alkyl, cycloalkyl, or perfluoroalkyl moiety; a $C_{5-20}$ alkane; a dialkyl ketone wherein at least one of the alkyl moieties is $C_3$ or greater; an amide corresponding to the formula $R^7CONHR^8$ wherein $R^7$ is hydrogen or $C_{1-10}$ alkyl and $R^8$ is $C_{1-10}$ alkyl; an acetyl or $C_{1-10}$ alkyl nitrile; acetone; a $C_{1-10}$ alkyl aldehyde; a trialkyl amine; nitromethane; trialkyl orthoformate; diacetone alcohol; dimethyl malonate; decahydronaphthalene; tetrahydronaphthalene; malononitrile; dicyclohexyl; ethylene carbonate; sulfolane; alkyl or cycloalkyl substituted benzene; or water.

The glycols and glycol ethers useful as non-solvents for the polycarbonate correspond to the formula $R^4O-(CH_2CH_2O)_q-R^4$ wherein $R^4$ is independently in each occurrence hydrogen, or $C_{1-4}$ alkyl, and q is an integer of about 1 to about 250. Preferably, $R^4$ is hydrogen. Preferably, q is an integer of about 2 to about 100, more preferably of about 3 to about 60, and most preferably about 3 to about 15. Examples of such glycols and glycols ethers include 2-ethoxyethanol, diethylene glycol dibutyl ether, a polyethylene glycol with a molecular weight of up to about 1450, triethylene glycol, and diethylene glycol. Esters useful as non-solvents correspond to the formula $R^5COOR^6$ wherein $R^5$ is hydrogen or $C_{1-19}$ alkyl, and $R^6$ is $C_{1-10}$ alkyl. Preferably, $R^5$ is hydrogen or $C_{1-4}$ alkyl, and $R^6$ is $C_{1-4}$ alkyl. Most preferably, $R^6$ is ethyl or methyl. Examples of preferred esters include methyl formate, ethyl formate, methyl acetate, n-octyl acetate, methyl laurate, methyl myristate, butyl stearate, and methyl stearate. Preferred alkanols useful as non-solvents include methanol, ethanol, 2-propanol, and 1-hexanol. Preferred cyclohexanes useful as non-solvents include those which are unsubstituted or substituted with a $C_{1-10}$ alkyl, $C_{3-10}$ cycloalkyl or $C_{1-4}$ perfluoroalkyl moiety. More preferred cyclohexanes useful as non-solvents include those which are unsubstituted or substituted with a $C_{1-4}$ alkyl, $C_{5-6}$ cycloalkyl or trifluoromethyl moiety. Examples of such cyclohexanes include cyclohexane, methyl-cyclohexane, isopropylcyclohexane, t-butyl-cyclohexane and dicyclohexyl. Preferred $C_{5-20}$ alkanes useful as non-solvents include hexane, dodecane, and hexadecane. Preferred dialkyl ketones useful as non-solvents for the polycarbonates include those wherein one of the alkyl moieties is $C_{3-10}$ and the other is $C_{1-10}$. Examples of preferred dialkyl ketones useful for non-solvents include methyl isobutyl ketone and diisopropyl ketone. Preferred amides useful as non-solvents include those amides corresponding to the formula $R^7CONHR^8$ wherein $R^7$ is preferably hydrogen or $C_{1-3}$ alkyl, and $R^8$ is preferably $C_{1-4}$ alkyl. Examples of preferred amides include N-methyl formamide, and N-methyl acetamide.

Preferable nitriles include acetyl and $C_{1-3}$ alkyl nitriles. Examples of preferred nitriles include acetonitrile and propionitrile. Preferred aldehydes are $C_{1-4}$ alkyl aldehydes, with butyraldehyde most preferred. Preferred substituted benzenes include formyl, alkyl, and cycloalkyl substituted benzenes which correspond to the formula

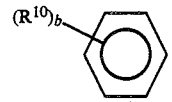

wherein $R^{10}$ is $C_{1-10}$ alkyl, $C_{3-10}$ cycloalkyl, or formyl, and b is as defined hereinbefore. Preferably, $R^{10}$ is $C_{1-4}$ alkyl, $C_{5-6}$ cycloalkyl, or formyl.

Preferred non-solvents include triethylene glycol, 2-ethoxyethanol, diethylene glycol dibutyl ether, a polyethylene glycol with a molecular weight of up to about 1450, diethylene glycol, dodecane, hexadecane, cyclohexane, methylcyclohexane, perchloroethylene, diisopropylketone, isopropylketone, isopropylcyclohexane, t-butylcyclohexane, N-methylformamide, decylene, N-methylacetamide, tetralin, dicyclohexyl, cyclohexyl benzene, diethylene glycol dibutylether, carbon tetrachloride, or water. More preferred non-solvents include water, diisopropylketone, tetraethylene glycol dimethylether, diethylene glycol dibutyl ether, hexadecane, diethylene glycol, triethylene glycol, polyethylene glycol with a molecular weight of up to about 1450, 2-ethoxyethanol, carbon tetrachloride, or dodecane. The most preferred non-solvent is triethylene glycol.

Some compounds may be both a solvent and a non-solvent, wherein its function is dictated by the temperature at which the membrane is formed.

In some embodiments, a solubilizing agent is used to aid in preparing a homogeneous polymer mixture. The solubilizing agent may be any solvent which aids in preparing a homogeneous polymer mixture. The solubilizing agent is preferably a solvent which has a boiling point lower than the extrusion temperature and the boiling points of the solvent and non-solvent. The polymer mixture may be formed at temperatures below the extrusion temperature and the solubilizing agent aids in forming a homogeneous mixture at such temperatures. Preferably, the solubilizing agent flashes off, or is removed, prior to extrusion. Preferred solubilizing agents include halogenated hydrocarbons, cyclic and non-cyclic ethers, and alkyl ketones. More preferred solubilizing agents include methylene chloride, tetrahydrofuran, methyl ethyl ketone, methyl iodide, and chloroform. A most preferred solubilizing agent is methylene chloride.

The solubilizing agent is not used in embodiments where the polycarbonate solvent and non-solvent are mixed at elevated temperatures under high shear or with good mixing, where the mixture is to be extruded shortly after formation of the homogeneous mixture. Certain solvents and non-solvents may cause degradation of the polycarbonate if the polymer mixture is maintained at elevated temperatures for extended periods of time.

The solvent and non-solvent should be chosen to be compatible. In particular, the non-solvent must be soluble in the solvent, and the non-solvent must be capable of forming pores in the quenched polymer in the presence of the solvent. Skilled artisans often describe the solvent and non-solvent as a solvent non-solvent pair. Preferred solvent non-solvent pairs include N-methylpyrrolidinone and triethylene glycol, N-methylpyrrolidinone and a polyethylene glycol with a molecular weight of up to about 1450, ethylene glycol dimethylether and water, tetrahydrofuran and water, ethylene glycol dimethylether and diisopropylketone, tetrahydrofuran and diisopropylketone, diethylene glycol dimethylether and water, diethylene glycol dimethylether and tetralin, tetraethylene glycol dimethylether and N-methyl-acetamide, acetophenone and diethylene glycol dibutylether, methylene chloride and carbon tetrachloride, cyclohexanone and dodecane, and acetophenone and hexadecane. More preferred solvent non-solvent pairs are N-methylpyrrolidinone and triethylene glycol, N-methylpyrrolidinone and a polyethylene glycol with a molecular weight of up to about 1450, cyclohexanone and dodecane, and acetophenone and hexadecane. The most preferred solvent non-solvent pairs are N-methylpyrrolidinone and triethylene glycol, and methylpyrrolidinone and a polyethylene glycol with a molecular weight of up to about 400.

The polymer mixture should comprise appropriate amounts of the polymer, solvent, and non-solvent to be extrudable at the extrusion temperatures and to form POWADIR membranes when processed as described herein. In particular, the solution should have an acceptable viscosity for such extrusion at extrusion temperatures. The upper limit on the viscosity is that viscosity at which the solution is too viscous to extrude. The lower limit on the viscosity is that viscosity at which the fiber loses its integrity after leaving the vicinity of the extrusion die.

Preferably, the polymer solvent non-solvent mixture has a viscosity at extrusion temperatures of about 50,000 to about 200,000 poise in the embodiment wherein the core fluid is a gas, and more preferably between about 60,000 and 100,000 poise. Preferably, the polymer used to prepare the membranes has a molecular weight (Mw) of 100,000 or greater, more preferably between 100,000 and 300,000.

Preferably, the spin composition comprises between 30 and 60 percent by weight of the polymer, and 40 and 70 percent by weight of the combined solvent and non-solvent. More preferably, the spin composition comprises between 40 and 60 percent by weight of the polymer, and 40 and 60 percent by weight of the combined solvent and non-solvent. Even more preferably, the spin composition comprises between about 44 and 56 percent by weight of polymer and between about 44 and 56 percent by weight of a mixture of solvent and non-solvent. Most preferably, the spin composition comprises between 50 and 55 percent by weight of polymer and between about 45 and 50 percent by weight of the combined solvent and non-solvent. The solvent and non-solvent are present in a ratio of between about 1.7 and 5.1, more preferably between about 1.8 and 2.7, and most preferably between about 2.0 and 2.4.

The composition of this invention is used in a process for preparing a POWADIR membrane comprising a halogenated bisphenol-based polycarbonate, which process comprises:

(A) forming a mixture comprising
(i) a bisphenol polycarbonate wherein at least 25 percent by weight of the bisphenol moieties are tetrahalogenated wherein the halogen is chlorine or bromine;
(ii) a solvent for the polycarbonate which comprises a glycol ether which corresponds to the formula $R^3O\text{-}(CH_2CH_2O)_r\text{-}R^3$ wherein $R^3$ is methyl or ethyl, and r is an integer of between about 1 and 20; a dialkyl ketone wherein the alkyl groups independently are methyl or ethyl; morpholine substituted on the nitrogen atom with an alkyl, formyl or alkanoyl moiety; unsubstituted or N-$C_{1-4}$ alkyl, N-$C_{5-6}$ cycloalkyl, or N-$C_{6-10}$ aryl or alkaryl substituted pyrrolidinone; $C_{1-4}$ alkoxycarbonyl, formyl, nitro, or halo substituted benzene; tetrahydrofuran; dimethyl formamide, cyclohexanone; N,N-dimethyl acetamide, acetophenone; caprolactone; methylene chloride; sulfolane; cyclohexyl acetate; 1,1,3,3,-tetramethylurea; isophorone; 1-formylpiperidine; methyl salicylate; hexamethylphosphoramide; phenyl ether; or bromonaphthalene; and,
(iii) a non-solvent for the polycarbonate which comprises a glycol or glycol ether which corresponds to the formula $R^4O\text{-}(CH_2CH_2O)_q\text{-}R^4$ wherein $R^4$ is independently in each occurrence hydrogen or $C_{1-4}$ alkyl, and q is an integer or about 1 to about 250; an ester corresponding to the formula $R^5COOR^6$ wherein $R^5$ is hydrogen or $C_{1-19}$ alkyl, and $R^6$ is $C_{1-10}$ alkyl; a $C_{1-10}$ alkanol; cyclohexane, unsubstituted or substituted with an alkyl, cycloalkyl, or perfluoroalkyl moiety; a $C_{5-20}$ alkane; a dialkyl ketone wherein at least one of the alkyl moieties is $C_3$ or greater; an amide corresponding to the formula $R^7CONHR^8$ wherein $R^7$ is hydrogen or $C_{1-10}$ alkyl and $R^8$ is $C_{1-10}$ alkyl; an acetyl or $C_{1-10}$ alkyl nitrile; acetone; a $C_{1-10}$ alkyl aldehyde a trialkyl amine; nitromethane; trialkyl ortho-formate; diacetone alcohol; dimethyl malonate; decahydronaphthalene; tetrahydronaphthalene; malononitrile; dicyclohexyl; ethylene carbonate; sulfolane; alkyl or cycloalkyl substituted benzene; or water;

(B) heating the mixture to a temperature at which the mixture forms a homogeneous fluid and is extrudable;

(C) extruding the heated mixture into a shape suitable for membrane use; and, (D) passing the formed membrane through one or more quench zones wherein the mixture phase separates, and the major portion of the solvent and non-solvent are removed from the formed membrane;

wherein the membrane formed is POWADIR with a discriminating region capable of separating oxygen from nitrogen.

The polycarbonate mixture may be extruded into any shape which is useful as a membrane. Such shapes include flat sheets, hollow tubes, and hollow fibers. The most preferred shape is the hollow fiber shape. The process for preparing this preferred shape may be described as follows. The following description of the process with respect to the formation of hollow fiber membranes refers to one fiber, but the process may be performed on one fiber at a time or a multitude of fibers simultaneously. In fact, most hollow fiber preparation processes involve forming several fibers and processing them simultaneously. The description shall be understood to include forming and processing one fiber or a multitude of fibers simultaneously.

A process for preparing a POWADIR hollow fiber comprising a bisphenol polycarbonate which comprises:

(A) forming a mixture comprising (i) a bisphenol polycarbonate wherein at least 25 percent by weight of the bisphenol moieties are tetrahalogenated wherein the halogen is chlorine or bromine;

(ii) a solvent for the polycarbonate which comprises a glycol ether which corresponds to the formula $R^3O\text{-}(CH_2CH_2O)_r\text{-}R^3$ wherein $R^3$ is methyl or ethyl, and r is an integer of between about 1 and 20; a dialkyl ketone wherein the alkyl groups independently are methyl or ethyl; morpholine substituted on the nitrogen atom with an alkyl, formyl or alkanoyl moiety; unsubstituted or N-$C_{1-4}$ alkyl, N-$C_{5-6}$ cycloalkyl, or N-$C_{6-10}$ aryl or alkaryl substituted pyrrolidinone; $C_{1-4}$ alkoxycarbonyl, formyl, nitro, or halo substituted benzene; tetrahydrofuran; dimethyl formamide, cyclohexanone; N,N-dimethyl acetamide, acetophenone; caprolactone; methylene chloride; sulfolane; cyclohexyl acetate; 1,1,3,3-tetramethylurea; isophorone; 1-formyl-piperidine; methyl salicylate; hexamethylphosphoramide; phenyl ether; or bromonaphthalene; and, (iii) a non-solvent for the polycarbonate which comprises a glycol or glycol ether which corresponds to the formula $R^4O\text{-}(CH_2CH_2O)_q\text{-}R^4$ wherein $R^4$ is independently in each occurrence hydrogen or $C_{1-4}$ alkyl, and q is an integer of about 1 to about 250; an ester corresponding to the formula $R^5COOR^6$ wherein $R^5$ is hydrogen or $C_{1-19}$ alkyl, and $R^6$ is $C_{1-10}$ alkyl; a $C_{1-10}$ alkanol; cyclohexane, unsubstituted or substituted with an alkyl, cycloalkyl, or perfluoroalkyl moiety; a $C_{5-20}$ alkane; a dialkyl ketone wherein at least one of the alkyl moieties is $C_3$ or greater; an amide corresponding to the formula $R^7CONHR^8$ wherein $R^7$ is hydrogen or $C_{1-10}$ alkyl and $R^8$ is $C_{1-10}$ alkyl; an acetyl or $C_{1-10}$ alkyl nitrile; acetone; a $C_{1-10}$ alkyl aldehyde; a trialkyl amine; nitromethane; trialkyl orthoformate; diacetone alcohol; dimethyl malonate; decahydronaphthalene; tetrahydronaphthalene; malononitrile; dicyclohexyl; ethylene carbonate; sulfolane; alkyl or cycloalkyl substituted benzene; or water;

wherein the mixture has a sufficient viscosity to allow extrusion at temperatures at which the mixture is homogeneous;

(B) heating the mixture to a temperature at which the mixture forms a homogeneous fluid and is extrudable;

(C) extruding the heated mixture into a hollow fiber form;

(D) passing the formed fiber through one or more quench zones wherein the the mixture phase separates, and the major portion of the solvent and non-solvent are removed from the formed fiber, while a core fluid is passed down the hollow core of the fiber under conditions sufficient to prevent the fiber from collapsing; and, wherein the fiber formed is a POWADIR fiber with a discriminating layer capable of separating oxygen from nitrogen.

A POWADIR membrane is a membrane which is porous with a discriminating region capable of separating one gas from another gas. A "POWADIR" membrane is a membrane which has one or more porous regions and one or more discriminating regions capable of separating one or more gases from one or more other gases, i.e., oxygen from nitrogen. Discriminating region refers to a region which functions to separate the one or more gases from one or more other gases, and may be a non-porous region or the equivalent of a non-porous region, or a region of non-continuous porosity. "Asymmetric" as used herein refers to a membrane which comprises a thin, dense, discriminating region and one or more porous layers which provide little resistance for the passage of fluids through such porous area to and from the dense discriminating region. Note that an asymmetric membrane is a POWADIR membrane. A POWADIR membrane need not be asymmetric. "Homogeneous fluid" as used herein refers to a fluid which is a mixture of components and which is in one phase. Extrusion refers herein to passing a fluid of the polymer mixture through a die to form the fluid into the desired shape. "Extrudable" as used herein refers to a material which is capable of extrusion to form a desired shape, wherein the material formed to such shape once formed retains such shape. "Quench" as used herein refers to exposing the homogeneous polymer mixture to conditions such that the polymer mixture partially or completely undergoes a phase separation. "Phase separation" refers herein to the phenomena wherein the polymer mixture undergoes separation into a polymer rich phase and a solvent non-solvent rich phase. "Leaching" as used herein refers to the phenomena wherein entrained solvent and non-solvent liquids are removed from the polymer rich phase. "Wet extrusion process" as used herein refers to the extrusion process useful for preparing membranes from the compositions of this invention using the wet or combined evaporation-diffusion technique which is that variation of the phase-inversion process in which a viscous polymer solution is either (1) allowed to partially evaporate after which it is immersed into a non-solvent gelation bath where whatever is left of the solvent-pore former system is exchanged for the non-solvent, or (2) is immersed directly into the non-solvent gelation bath for the exchange of the solvent system for non-solvent, as described by Kesting, *Synthetic Polymeric Membranes*, 2nd Edition, John Wiley & Sons, New York, N.Y., 1985, pp. 251–252.

Prior to extrusion, the mixture is heated to a temperature at which the mixture is homogeneous and has an appropriate viscosity for extrusion. The upper limit on the pre-extrusion temperature is that temperature at which the polymer undergoes detrimental degradation in the presence of the particular solvent and non-solvent. Detrimental degradation means herein that the polymer degrades sufficiently that the viscosity of the polymer mixture is significantly lowered below that viscosity at which acceptable membranes can be formed, or the polymer mixture cannot form a POWADIR membrane which is capable of separating oxygen from nitrogen. In the embodiment wherein the membrane is a hollow fiber and the core fluid is a gas, this is indicated where the hollow fiber collapses in the quench zone. Preferred upper pre-extrusion temperatures are about 200° C.; more preferred upper pre-extrusion temperatures are about 130° C. This upper limit is significantly affected by the kind of extrusion apparatus that is used. Generally, there is a trade-off between the temperature to which you can raise the composition and the residence time in the heating area. With lower residence times, the polymer mixture can be heated to higher temperatures. The lower limit on the pre-extrusion temperature is that temperature at which the viscosity of the spin solution is sufficiently low enough to allow extrusion. Preferred lower temperatures are 50° C. or above; more preferred lower temperatures are 90° C. or above. Generally, the spin solution is extruded at the temperatures described hereinbefore with respect to the pre-extrusion heating. Provided the temperature of the polymer mixture during extrusion is within the functional limits described hereinbefore, the actual temperature of extrusion can be significantly lower than the pre-extrusion temperature, for example, as much as 20° C. lower.

The polymer is extruded into one or more quench zones. Such zones function to facilitate phase separation of the polymer mixture, removal of a large portion of the solvent and the non-solvent, and to provide a zone where the fiber may be drawn to its final diameter. The quench zone may comprise one or more zones. Such zones may be air quench zones, liquid quench zones, or a combination thereof. In one embodiment, the extruded polymer mixture may be extruded into an air quench zone, the extruded polymer mixture may thereafter be passed into one or more liquid quench zones. In another embodiment, the polymer mixture may be extruded directly into a liquid quench zone, and thereafter may be passed into one or more additional liquid quench zones.

In a preferred embodiment, the polymer mixture is extruded into an air quench zone, and thereafter passed into one or more liquid quench zones. In this embodiment the polymer mixture begins to lose a portion of the solvent due to volatilization and a significant amount of the draw-down of the fiber occurs in the air quench zone. Further, the phase separation of the polymer mixture may begin in this zone. The temperature and residence time in the air quench zone should be sufficient such that there is partial removal of the solvent in the zone, the polymer mixture does not undergo complete phase separation in said zone, and the fiber is drawn down to the desired diameter during the process. If the polymer mixture completely phase separates prior to exiting the air quench zone, a significant amount of solvent and non-solvent may be entrained in the polymer mixture such that it cannot easily be removed from the polymer. The upper limit on the temperature on the air zone is that temperature below which the polymer mixture has sufficient viscosity to retain its shape and integrity. Preferred upper temperatures are about 90° C., with more preferred upper temperatures being about 40° C., and the most preferred upper temperatures being about 25° C. The lower temperature of the air quench zone is that temperature above which the polymer mixture undergoes complete phase separation while in the air quench zone. Preferred lower temperatures are about 0° C. or above, with more preferred lower temperatures being about 10° C. or above, and the most preferred lower temperatures being about 20° C. or above. As noted hereinbefore, the temperatures and the residence time are interdependent variables; at cooler temperatures the residence time is shorter while at higher temperatures the residence time is longer so as to achieve the desired results in the air quench zone.

The preferred upper limit of the residence time in the air quench zone is about 10 seconds or less, more preferably 6 seconds or less, and most preferably 1 second or less. The lower residence time is preferably 0.1 seconds or greater and most preferably 0.25 seconds or greater. If the environment in the air quench zone is too humid, damage to the extruded shape may occur. Preferably, the humidity at about 24° C. is 60 percent or less. A more preferred humidity range is between about 30 and 60 percent at 24° C. It may be desirable to place a shroud around the air quench zone so as to cut down variability in the shapes due to undesired air currents. In some embodiments, it may be desirable to cool the shroud so as to allow better control of the quenching in the air draw zone. In one embodiment it may be preferred to pass a gentle stream of air in a counter-current fashion along the shape as it is being extruded.

The speed of extrusion is not critical to the process provided an acceptable residence time in the quench zones is achieved. Therefore, the line speed may be as fast as the equipment, including the size of the quench zones, allows and which results in acceptable properties in the membranes. Preferably, lower line speeds are 50 feet per minute or above, with about 150 feet per minute or above preferred. Preferably, upper line speeds are 1000 feet per minute or below, with 500 feet per minute or below preferred. In that embodiment where hollow fiber membranes are being formed, a core fluid is preferably passed down the core of the hollow fiber to prevent the fiber from collapsing. The core fluid may be any fluid which prevents the fiber from collapsing and which does not deleteriously affect the membrane properties. The core fluid may be a gas or a liquid, preferably a gas. Preferred core gases may include air, nitrogen, argon, or a gas which enhances the properties of the membrane. The core fluid pressure may be any pressure which prevents the fiber from collapsing and which does not deleteriously affect the membrane properties of the fiber, and is preferably between about 0.1 and 0.5 inches or water, more preferably 0.25 to 0.4 inches of water.

From the air quench zone, the membrane is preferably passed into one or more liquid quench baths. In the liquid quench baths, the membrane completes phase separation and a major portion of the remaining solvent and non-solvent are removed. The liquid quench baths can comprise any liquid which dissolves both the solvent and non-solvent and which does not deleteriously affect the membrane properties. Examples of preferred quench liquids include lower alcohols, water, fluorocarbons, lower aliphatic hydrocarbons, or mixtures thereof. The preferred quench bath liquid is water. Optionally, after leaving the first liquid quench bath, the membrane may be passed through or contacted with other liquid baths. The conditions of each bath is dependent upon the number of baths used and the conditions of each bath. The conditions of the first liquid quench bath is dependent upon whether other liquid quench baths are used. If only one bath is used, the conditions should be such that the fiber completes its phase separation, and the majority of the solvent and non-solvent are removed from the fiber in the bath. Under such circumstances, a preferred upper temperature is 90° C. or below and 30° C. or below being most preferred. The preferred lower temperature is 0° C. or above, with 20° C. or above being more preferred. The residence time under this condition should be sufficient to allow completion of the phase separation of the fiber and to allow removal of a significant portion of the remaining solvent and non-solvent. The residence time in the single bath can be as long as the economics of the process allow. Such residence times may be as long as no deleterious effects result from such residence times, for example damage from bacterial growth. Residence times of up to several days may be used. Preferably, the upper limit on the residence time is about 30 minutes or lower, more preferably 10 minutes or lower. Preferably, the lower residence time is 2 minutes or greater, more preferably 5 minutes or greater.

In a preferred embodiment, two liquid quench baths are used. In this embodiment, the quench bath temperature and residence time in the first quench bath should be sufficient to result in significant phase separation of the polymer mixture in said zone, and to allow some of the solvent and non-solvent to be removed from the fiber. The lower bath temperature may be the temperature above the freezing point of the bath. Generally the lower the bath temperature the better the bath functions. Where the bath comprises water, the preferred lower temperature is 0° C. or greater. The preferred upper temperature is 30° C. or less, more preferably 20° C. or less, and most preferably 10° C. or less. The lower limit on the residence time is preferably 0.1 seconds or greater, and more preferably 1.0 second or greater. The upper residence time is preferably 600 seconds or less, more preferably 300 seconds or less, even more preferably 20 seconds or less, and most preferably 2 seconds or less. The second liquid quench bath functions to remove most of the remaining solvent and non-solvent. The conditions of the second liquid quench bath should be such that most of the solvent and non-solvent are removed during its presence in the bath. The temperature of the second liquid quench bath is that temperature which facilitates the removal of the solvent and non-solvent from the membrane. The upper temperature is that temperature at which either the bath remains in the liquid form, or the fiber properties are deleteriously affected. The lower limit on temperature is that temperature below which the solvent and non-solvent are no longer removed from the polymer mixture at an acceptable rate. In the most preferred embodiment wherein the bath comprises water, the preferred lower temperatures are 70° C. or above with a more preferred lower temperature of 80° C. or above. In this embodiment, preferred upper temperatures are 100° C. or below and more preferred upper temperatures are 90° C. Generally, as the temperature is lowered, the residence time required to achieve the same removal of solvent and non-solvent becomes longer. After the fiber is removed from the one or more quench baths, the fiber preferably contains 1.2 percent or less of the solvent and non-solvent, and more preferably less than 0.5 percent by weight of the solvent and non-solvent.

In the embodiments wherein one pr more liquid quench baths are used, after removal from the first liquid quench bath, the fibers are passed over a set of godets and either passed into another bath or taken up. After completion of the processing, the fibers may be stored in a liquid which does not deleteriously affect the properties of the fibers. The most preferred liquid is water.

The membranes prepared from the composition of this invention are POWADIR in that such membranes have one or more regions of porosity and one or more discriminating regions or which exhibit the properties of a discriminating region in that the region is capable of separating one or more gases from one or more other gases, i.e., oxygen from nitrogen. In one embodiment, the membrane is a classic asymmetric membrane comprising a porous support layer and a dense region which is on one face of the membrane, commonly referred to as a skin. In a preferred embodiment, the membrane comprises a porous layer on both sides of the membrane, i.e., both the exterior and the interior of a hollow fiber, with an interior region which is discriminating or functions as if it were dense, that is a permeant cannot cross from one surface of the membrane to the other without permeating into and through a non-porous or dense region of the membrane. Such a discriminating region may be a region of non-continuous porosity. Preferably, the membranes exhibit bulk porosities of between about 40 and about 50 percent. In one embodiment of this membrane in the hollow fiber form, the region of noncontinuous porosity is located near the lumen of the fiber.

In the embodiment wherein the membrane is a hollow fiber, the fiber size is that fiber size which allows good separation of oxygen from nitrogen with reasonable flux, and acceptable pressure drops across the fiber. Preferably, the fiber size is between about $175 \times 117$ (outside diameter OD $\times$ inside diameter ID) microns to about $100 \times 65$ microns and has an OD/ID ratio of about 1.5. Preferably, the fiber has a separation factor for oxygen and nitrogen of 6.0 and greater, more preferably 6.5 or greater, and most preferably 6.8 or greater. Preferably, the fiber has a flux of $3.0 \times 10^{-6}$) scc/cm$^2$ cmHg sec. or greater, more preferably $6.0 \times 10^{-6}$) scc/cm$^2$ cmHg sec. or greater, and most preferably $8.0 \times 10^{-6}$) scc/cm$^2$ cmHg sec. or greater.

Before fabrication of a module, the membrane is preferably dried. The membrane may be dried by exposing it to the flow of air or an inert gas. Such exposure preferably takes place at a temperature of between about 20° C. and about 80° C. Such gas flow may be a gentle flow either substantially perpendicular to the longitudinal direction of the membrane or along the longitudinal direction of the membrane. In another embodiment wherein the membrane is in the hollow fiber form, the gas may be blown down the core during winding of the module. The gas used to dry the membrane may be any gas which is sufficiently dry to aid in the removal of water from the pores and lumen of the membrane. Such gases include nitrogen, argon, and air.

As used herein, the term semi-permeable membrane refers to a membrane which displays different permeabilities for different species of molecules, and therefore may be used in the separation of ions and molecules having different permeabilities across the membrane. Permeate as used herein refers to those species which permeate through the membrane at a much faster rate than other species. Non-permeate refers herein to those species which permeate at a much slower rate than the other species present.

Preferably, the membrane exhibits separation properties similar to a dense membrane with a thickness of between about 0.05μ and 10μ, more preferably between about 0.1μ and 2μ.

Under certain conditions, it may be highly desirable to provide support to the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the prior art. The membrane affixed to the frame can then be sealingly engaged in the conventional manner in a vessel so that the membrane surface inside the framing support separates two otherwise non-communicating compartments in the vessel. The skilled artisan will recognize that the structure which supports the membrane can be an integral part of the vessel or even the outer edge of the membrane.

The membranes may be used for separating oxygen from nitrogen by contacting a gaseous stream containing oxygen and nitrogen with the membrane under conditions such that oxygen selectively permeates through the membrane, in comparison to nitrogen. Preferably, the membrane is sealingly engaged to a vessel which defines a space communicating with only one side of the membrane, such that the permeable oxygen contacting the other side of the membrane can permeate through the membrane to the non-communicating space, at a significantly faster rate than the nitrogen communicates or permeates through the membrane. Preferably, the oxygen and nitrogen are a part of an air stream. Preferably, the pressure on the communicating side of the membrane is between about 40 psia (about 276 kPa) and about 200 psia (about 1378 kPa), more preferably between about 80 (about 551 kPa) and about 120 psia (about 827 kPa). The temperature at which the mixed oxygen and nitrogen stream is contacted with the membrane is preferably between about 0° and 80° C., most preferably between about 0° and 45° C. The pressure differential across the membrane is preferably between about 40 psia (about 276 kPa) and about 200 psia (about 1378 kPa), and more preferably between about 95 (about 655 kPa) and about 120 psia (about 827 kPa).

In one preferred embodiment, the membrane is in a hollow fiber form. In the embodiment wherein the membrane is in hollow fiber form, it is preferable to contact the mixed nitrogen and oxygen stream with a membrane on the inside of the hollow fiber under conditions such that the oxygen selectively permeates out of the hollow fibers and a stream which is rich in oxygen is taken off of the shell side of the membrane. This oxygen-enriched stream can be further oxygen enriched by contacting with one or more membranes in succession.

In certain embodiments, the separations of oxygen from nitrogen may be performed at lower temperatures, preferably at about 10° C. or below. It has been discovered that the membranes useful in this invention have surprisingly high separation factors at 10° C. or below. Such separation factors are preferably 8.0 or greater, more preferably 8.5 or greater, and even more preferably 9.0 or greater at 10° C. or below.

SPECIFIC EMBODIMENTS

The following examples are included for illustrative purposes only and do not limit the scope of the claims or the invention. Unless otherwise stat-ed, all parts and percentages are by weight. In each of the examples at least four samples are tested for permeation properties. The flux and separation factor data are reported as an average of all of the samples with a standard deviation. Molecular weights as used herein are weight average molecular weights measured using narrow molecular weight range polystyrene standards.

EXAMPLES 1-14-PREFERRED SPIN CONDITIONS FOR TETRABROMOBISPHENOL A POLYCARBONATE HOLLOW FIBER MEMBRANES

In order to form a basis from which comparisons can be made, a set of standard spinning and processing conditions are developed. The selection of this standard set of conditions is based on data from early attempts to prepare fibers and corresponds to fiber that is easily formed and gives consistent results from one spin run to another. A series of fourteen experiments using the standard set of conditions are performed to prepare fibers and the fibers are tested for oxygen and nitrogen permeation. These permeation and separation factors for these fourteen experiments are averaged to give a performance standard to measure all other experiments against.

A composition of 52 weight percent tetrabromobisphenol A polycarbonate, 32.5 weight percent N-methyl pyrrolidone (solvent), and 15.5 weight percent of triethylene glycol (non-solvent), (solvent to non-solvent ratio of 2.1) is fed into the melt pot of a melt pot extruder. Methylene chloride in an amount equal to about 30 weight percent of the total composition is added to the vessel. The mixture is heated to 95° C. and held until the mixture is a homogeneous solution. Most of the methylene chloride flashes during this heating step. A nitrogen purge is passed into the melt pot at 500cc per minute and nitrogen containing volatilized methylene chloride is withdrawn from a port in the melt pot. From the melt pot the composition is passed to a transfer line and pumped to the spinnerette at a flow rate of 15 g/min. The transfer line and spinnerette face are held at a temperature of 75° C. The composition is extruded into a hollow fiber shape through an annulus of 254 microns (0.01 inch) with an outside diameter of 1727 microns (0.68 inch) with a core gas pin feeding a core gas of nitrogen down the the bore at a rate of 8.8 standard cubic centimeters a minute. The line speed is 100 feet per minute. The fiber is extruded into an air quench zone of a length of 1 foot at ambient temperature. The fiber is passed into a quench bath of water at 4° C. with a residence time of 1.7 seconds. The fiber is taken up and thereafter placed into a bath of water at 90° C. for ten minutes. The fibers are hung vertically and dried by passing air over the fibers at a flow of 100 ft/min over the fibers for about two hours. The fibers prepared have a size of 140×94microns (OD×ID). All of the fibers prepared in these examples have a porous inner surface and a porous outer surface with a discriminating region internal to the fiber which is capable of separating oxygen from nitrogen.

PERMEABILITY TESTING PROCEDURE

After the fiber is dried, the fibers are tested for permeation properties. The test device is a pressure vessel with four ports, two tube sheet ports, one feed port through which the compressed gas enters the vessel, and an exit or purge port through which the compressed gas can be purged from the vessel. Two hundred ten (210) fibers are passed into one of the tubesheet ports and out the other, allowing for a 31.5 cm length of the fibers to be contained within the test device. Epoxy tubesheets are formed in the two tubesheet ports to give a leak-tight bond between the fiber and the two ports. Test units are then pressurized with nitrogen at 50 psig by allowing compressed nitrogen to enter the test device through the feed port while leaving the exit port closed. The exit port is then opened for two minutes to purge the vessel of air and then closed with pure nitrogen left in the vessel. With the exit port closed and the feed port opened, the gas contained within the test device, by means of a pressure driving force, permeates through the walls of the hollow fibers and passes through the lumen of the fibers and out through the tubesheet ports where the flow rate is measured either by means of bubble or mass flow meters. There is negligible back pressure on the gas exiting the tubesheet. After testing with nitrogen, the feed gas is changed to oxygen and the vessel is purged for about two minutes to give pure oxygen at 50 psig in the test device. The amount of oxygen permeating through the fiber walls is measured by combining the outputs from the two tubesheet ports. From these flow measurements, the gas permeation rates and separation factor can be calculated by use of the following equations.

$$\text{Nitrogen flux} = \frac{\text{Measured flow (sccm)}}{\text{surface area of fiber (cm}^2\text{)} \times \text{pressure (cm Hg)} \times 60 \text{ (seconds/minute)}}$$

$$\text{Oxygen flux} = \frac{\text{Measured flow (sccm)}}{\text{surface area of fiber (cm}^2\text{)} \times \text{pressure (cm Hg)} \times 60 \text{ (seconds/minute)}}$$

The units are scc/cm$^2$ cmHg sec.
Measured flow = standard cubic centimeters/minute.
Surface area of fibers = 3.14 × OD (outside diameter, cm) × length × the number of fibers.
Pressure (cm Hg) = psi × 76/14.7.
Separation factor is defined as the Oxygen flux divided by the Nitrogen flux.
The results are compiled in Table 1.

TABLE 1

| Example | Oxygen Flux[2] | Oxygen/Nitrogen Separation Factor |
|---|---|---|
| 1 | 4.8 ± .5 | 6.8 ± .1 |
| 2 | 7.4 ± .4 | 6.4 ± .1 |
| 3 | 6.2 ± .1 | 6.4 ± .3 |
| 4 | 7.6 ± .3 | 6.7 ± .1 |
| 5 | 7.0 ± .1 | 5.9 ± .1 |
| 6 | 5.8 ± .2 | 6.8 ± .2 |
| 7 | 9.0 ± .2 | 6.8 ± .2 |
| 8 | 8.3 ± .1 | 6.7 ± .1 |
| 9 | 7.2 ± .1 | 6.0 ± .2 |
| 10[1] | 4.4 ± .4 | 6.0 ± .2 |
| 11 | 6.5 ± .3 | 6.0 ± .5 |
| 12 | 6.1 ± .1 | 6.2 ± .1 |
| 13 | 7.4 ± .1 | 6.5 ± .1 |
| 14 | 8.1 ± .1 | 6.6 ± .2 |
| AVERAGE | 7.0 ± 1.1 | 6.4 ± .3 |

[1]Not included in average, suspect blend composition
[2]Units (1 × 10$^{-6}$) scc/cm$^2$ · cmHg · sec

EXAMPLES 15-33

Hollow fibers are prepared using the standard conditions described hereinbefore using several spin compositions. The hollow fibers prepared are tested for oxygen and nitrogen permeability using the procedure described hereinbefore. The various spin compositions and results are compiled in Table 2. The spin compositions have about 1 to about 6 percent residual methylene chloride therein.

TABLE 2

| Example | Polymer in Spin Composition wgt % | Solvent to Non-solvent ratio | Oxygen Flux | Separation Factor | Melt Pot Temperature °C. |
|---|---|---|---|---|---|
| 15 | 45 | 2.1 | 6 ± .5 | 3 ± .4 | 85 |
| 16 | 45 | 2.1 | 2. ± 1 | 5 ± .3 | 110 |
| 17 | 45 | 2.5 | 1.7 ± .1 | 5 ± .5 | 85 |
| 18 | 45 | 2.3 | 5 ± .9 | 2.4 | 110 |
|    |    |     | 2 ± .2 | 4.0 |     |
| 19 | 52 | 2.1 | 8 ± 1 | 6.5 ± .3 | 98 |
| 20 | 52 | 2.0 | 10 ± 1 | 6.5 ± .3 | 98 |
| 21 | 44 | 1.9 | 4.2 ± .2 | 3.5 ± .2 | 80 |
| 22 | 44 | 2.1 | 4 ± .2 | 3.9 ± .3 | 80 |
| 23 | 44 | 2.3 | 2 ± .2 | 3.8 ± .1 | 80 |
| 24 | 50 | 2.1 | 7 ± .1 | 5.5 ± .1 | 92 |
| 25 | 54 | 2.1 | 7.3 ± .1 | 6 ± .1 | 92 |
| 26 | 51 | 1.9 | 5.4 ± .2 | 5.3 ± .2 | 95 |
| 27 | 51 | 2.1 | 7 ± .4 | 5.8 ± .2 | 95 |
| 28 | 53 | 2.1 | 3.6 ± .3 | 6.3 ± .4 | 95 |
| 29 | 53 | 1.9 | 2.8 ± .4 | 5.5 ± .1 | 95 |
| 30 | 53 | 1.9 | 4.8 ± .2 | 6.7 ± .1 | 95 |
| 31 | 52 | 1.9 | 9.7 ± .4 | 4.3 ± .5 | 95 |
| 32 | 52 | 2.0 | 9.8 ± .1 | 6.2 ± .2 | 95 |
| 33 | 52 | 2.05 | 9.1 ± .3 | 6.1 ± .1 | 95 |
| 34 | 52 | 2.3 | * | * | * |
| 35 | 52 | NMP only | ** | ** | ** |
| 36 | 52 | 25 | 0.2 ± .05 | *** | *** |

*Fiber did not phase separate
**Composition not spinnable
***Not measurable, flow rates less than 0.05.

EXAMPLES 37-40

Hollows fibers are prepared from spin compositions containing polymers of two different molecular weights than the molecular weights of the polymer used to set the standard conditions of Examples 1-14. The polymer content of the spin composition and the solvent to non-solvent ratio is described in Table 3. The results are contained in Table 3.

TABLE 3

Use of Various Polymers with Different Molecular Weights

| Example | $M_w$[1] | % Polymer | S/NS[2] | Flux | Separation Factor | Melt Pot Temperature |
|---|---|---|---|---|---|---|
| 37 | 125,000 | 52 | 2.1 | 6.1 | 2.8 | 80 |
| 38 | 191,000 | 52 | 2.10 | 8.6 | 4.0 | 95 |

TABLE 3-continued
Use of Various Polymers with Different Molecular Weights

| Example | $M_w$[1] | % Polymer | S/NS[2] | Flux | Separation Factor | Melt Pot Temperature |
|---|---|---|---|---|---|---|
| 39 | 191,000 | 52 | 2.13 | 8 | 3.7 | 95 |
| 40 | 191,000 | 52 | 2.16 | 9.5 | 6 | 98 |
| Standard Conditions | 163,000 | 52 | 2.1 | 7.0 ± 1.1 | 6.4 | 95 |

[1]The stated values are rounded to the nearest thousand.
[2]S/NS is the solvent non-solvent ratio.

EXAMPLES 41–44

Hollow fibers are prepared using the standard conditions using three different line speeds, and the fibers are tested for oxygen and nitrogen permeabil·ity. The size of the quench zones are adjusted to keep the residence times of the fibers in the baths constant. The conditions and the results are compiled in Table 4.

TABLE 4
FIBER PROPERTIES AS A FUNCTION OF LINE SPEED

| Example | Line Speed (Feet/Minute) | Flux | Oxygen/Nitrogen Separation Factor | Fiber Size (Microns) |
|---|---|---|---|---|
| 41 | 50 | 5.13 ± .28 | 5.44 ± .28 | 140 × 94 |
| 42 | 100[1] | 7.02 ± .1 | 5.85 ± .10 | 140 × 94 |
| 43 | 100[2] | 5.79 ± .18 | 6.80 ± .20 | 140 × 94 |
| 44 | 150[2] | 5.59 ± .10 | 7.21 ± .20 | 140 × 94 |

[1]Fibers in Examples 41–42 are prepared from the same melt pot run.
[2]Fibers in Examples 43–44 are prepared from the same melt pot run.

EXAMPLES 45–60

Several hollow fibers are prepared using the standard conditions with the exception that different fiber sizes are prepared. The fibers are tested for oxygen and nitrogen permeabilities. The results are compiled in Table 5.

TABLE 5
FIBER PROPERTIES AS A FUNCTION OF FIBER SIZE

| Example | Fiber Size (Microns) | O₂ Flux | Separation Factor |
|---|---|---|---|
| 45* | 204 × 140 | 0.5 ± .08 | 6.4 ± .4 |
| 46 | 140 × 94 | 3.4 ± .21 | 5.3 ± .5 |
| 47 | 158 × 106 | 3.8 ± .5 | 6.7 ± .1 |
| 48 | 140 × 94 | 4.8 ± .5 | 6.8 ± .1 |
| 49 | 112 × 74** | 6.8 | 6.1 |
| 50 | 140 × 94 | 8.3 ± .1 | 6.7 ± .05 |
| 51 | 125 × 85 | 7.9 ± .1 | 6.5 ± .2 |
| 52 | 140 × 94 | 4.4 ± .4 | 6.0 ± .2 |
| 53 | 112 × 74 | 7.5 ± .1 | 5.6 ± 0.5 |
| 54 | 140 × 94 | 7.3 ± .3 | 5.8 ± .1 |
| 55 | 112 × 74 | 10.8 ± 1.0 | 5.3 ± .9 |
| 56 | 140 × 94 | 7.4 ± .1 | 6.5 ± .1 |
| 57 | 112 × 74** | 11 | 5.2 |
| 58 | 106 × 64 | 8.8 ± .3 | 5.3 ± .3 |
| 59 | 103 × 68 | 10.9 ± 1.3 | 3.7 ± 1.1 |
| 60 | 110 × 74 | 10.0 ± .8 | 4.0 ± 1.3 |

*The fiber is solvent dried with a 50/50 mix isooctane-isopropyl alcohol prior to testing
**Results of only one out of four samples Examples 45–46, 47–49, 50–51, 52–53, 54–55, and 56–60 are generated from the same melt pot run.

The fiber size has a significant effect on the permeability characteristics of the hollow fibers. In general, the smaller the fiber the higher the intrinsic permeation rate of oxygen, while the separation factor is fairly insensitive to fiber size.

EXAMPLES 61–68

Several hollow fibers are prepared using the standard conditions described hereinbefore, with the exception that the residence time and the temperature of the quench bath is altered. The fibers are tested for oxygen and nitrogen permeability. The results are compiled in Table 6.

TABLE 6
FIBER PROPERTIES AS A FUNCTION OF QUENCH BATH CONDITIONS

| Example | Residence Time (Seconds) | Temperature °C. | Flux | Separation Factor |
|---|---|---|---|---|
| 61 | 1.7 | 5° C. | 8.1 ± .1 | 6.0 ± .2 |
| 62 | 1.7 | 22° C. | 5.4 ± .2 | 6.1 ± .5 |
| 63 | 1.7 | 5° C. | 7.0 ± .1 | 5.9 ± .1 |
| 64 | 0.6 | 5° C. | 7.1 ± .3 | 5.4 ± .1 |
| 65 | 1.7 | 5° C. | 9.0 ± .2 | 6.8 ± .2 |
| 66 | 0.6 | 5° C. | 8.4 ± .2 | 6.9 ± .2 |
| 67* | 1.7 | 2° C. | 7.8 ± .1 | 6.1 ± .1 |
| 68* | 1.7 | 6° C. | 6.1 ± .3 | 6.0 ± .1 |

*Fiber size held at 140 × 94

Examples 61 and 62, 63 and 64, 65 and 66, and 67 and 68, respectively, are from the same melt pot runs.

The residence time in the first liquid quench bath, from 1.7 to 0.6 seconds, has little effect on the ultimate performance of the fiber. Temperature has an effect on the fiber's gas permeation properties. As the temperature is raised from 5° to 22° C., the oxygen permeability is lowered. The selectivity of the fiber appears to be unaffected by this temperature change.

EXAMPLES 69–88

Several hollow fibers are prepared using the procedure described hereinbefore, with the exception that some of the hollow fibers are processed through a third bath of water placed between the first and second baths. The third bath is held at a temperature of about 20° C. and the residence time is about two minutes. The fibers are tested for oxygen and nitrogen permeability. The results are compiled in Table 7. The total residence time of the fiber in the baths is the same whether two or three baths are used.

TABLE 7
GAS PROPERTIES OF FIBERS PROCESSED WITH AND WITHOUT A THIRD LIQUID BATH

| Example | Percent Polymer | Third Bath | Flux | Separation Factor | Fiber Size (Microns) |
|---|---|---|---|---|---|
| 69 | 53 | Y | 4.6 ± 1 | 7.0 ± .2 | 140 × 94 |
| 70 | 52 | N | 4.8 ± 5 | 6.8 ± .1 | 140 × 94 |
| 71 | 52 | Y | 4.0 ± 3 | 6.7 ± .1 | 158 × 106 |
| 72 | 52 | N | 3.8 ± .5 | 6.7 ± .1 | 158 × 106 |
| 73 | 52 | Y | 6.9 ± 4 | 5.2 ± 7. | 112 × 74 |
| 74 | 52 | N | 6.8 | 6.1 | 112 × 74 |
| 75 | 50 | Y | 6.9 ± .1 | 5.5 ± .1 | 140 × 94 |
| 76 | 50 | N | 7.3 ± .6 | 5.1 ± .2 | 140 × 94 |
| 77 | 50 | Y | 4.6 ± .2 | 5.5 ± .2 | 158 × 106 |
| 78 | 50 | N | 5.1 ± .5 | 5.0 ± .2 | 158 × 106 |
| 79 | 50 | Y | 12.5 ± .5 | 3.4 ± .2 | 112 × 74 |
| 80 | 50 | N | 14.0 | 3.5 | 112 × 74 |
| 81 | 54 | Y | 5.1 ± .1 | 5.8 ± .2 | 140 × 94 |
| 82 | 54 | N | 7.3 ± .1 | 6.0 ± .1 | 140 × 94 |
| 83 | 54 | Y | 2.3 ± .1 | 5.4 ± .1 | 158 × 106 |
| 84 | 54 | N | 4.2 ± .4 | 5.8 ± .1 | 158 × 106 |
| 85 | 54 | Y | 20.2 ± 3 | 1.4 ± .1 | 112 × 74 |
| 86 | 54 | N | 23.3 ± 2 | 1.4 ± .1 | 112 × 74 |
| 87 | 52 | Y | 4.8 ± .7 | 6.5 ± .1 | 140 × 94 |

TABLE 7-continued
GAS PROPERTIES OF FIBERS PROCESSED WITH AND WITHOUT A THIRD LIQUID BATH

| Example | Percent Polymer | Third Bath | Flux | Separation Factor | Fiber Size (Microns) |
|---|---|---|---|---|---|
| 88 | 52 | N | 7.4 ± .4 | 6.4 ± .1 | 140 × 94 |

The presence of a third liquid bath demonstrates its greatest effect in Examples 81–86 where the polymer weight percentage is about 54. This is exhibited primarily in the oxygen permeation rate, with little affect on the separation factor. Examples 69–74, 75–80, 81–86, and 87–88, respectively, are prepared from the same melt pot run.

EXAMPLE 89

A hollow fiber is prepared using the standard procedure with the addition of the third liquid bath, and the fibers are analyzed for residual solvent, and non-solvent after each bath. The temperature and residence in the third bath is about the same as the third bath in Examples 69–88. The total residence time of the fiber in the three baths is the same where two baths are used. The results are compiled in Table 8.

TABLE 8
PLASTICIZER CONTENT OF FIBER AT VARIOUS STAGES OF PROCESSING

| STAGE | PERCENT NMP | PERCENT TEG | PERCENT METHYLENE CHLORIDE |
|---|---|---|---|
| Pre-extrusion | 32.5 | 15.6 | 3.0 |
| After first bath | 15.7 | 7.5 | 0 |
| After second bath | 5.0 | 0 | 0 |
| After third bath | 0.7 | 0 | 0 |

Note: Half of the solvent and non-solvent are removed in the air quench zone and first liquid quench (the bath temperature is 4.5° C., and the residence time is 1.7 seconds). The fiber size is 140×94 microns.

EXAMPLES 90–105

Several hollow fibers are prepared using the standard conditions described hereinbefore, with the exceptions that the residence time and temperature of the second liquid bath are altered.

TABLE 9
FIBER PROPERTIES AS A FUNCTION OF SECOND LIQUID BATH CONDITIONS

| Example | Temperature °C. | Time (Minutes) | Percent Residual Solvent and Non-solvent | Flux | Separation Factor |
|---|---|---|---|---|---|
| 90 | 90 | 10 | <1 | 3.1 ± .1 | 6.6 ± .2 |
| 91 | 90 | ½ | 0 | 4.9 ± .4 | 6.4 ± .1 |
| 92 | 90 | 1 | 0 | 5.0 ± .3 | 6.4 ± .3 |
| 93 | 90 | 5 | 0 | 7.0 ± .2 | 6.5 ± .1 |
| 94 | 90 | 10 | 0 | 7.4 ± .4 | 6.4 ± .1 |
| 95 | 90 | 10 | 0 | 5.8 ± .2 | 6.8 ± .2 |
| 96 | 70 | 1 | 0 | 3.9 ± .4 | 7.0 ± .1 |
| 97 | 70 | 5 | 0 | 4.4 ± .1 | 7.3 ± .2 |
| 98 | 70 | 10 | 0 | 5.0 ± .2 | 6.8 ± .1 |
| 99 | 90 | 10 | 0 | 9.0 ± .2 | 6.8 ± .2 |
| 100 | 90 | 10 | *3 | 6.3 ± .2 | 7.0 ± .3 |
| 101 | 70 | 10 | 0 | 7.1 ± .1 | 7.0 ± .2 |

TABLE 9-continued
FIBER PROPERTIES AS A FUNCTION OF SECOND LIQUID BATH CONDITIONS

| Example | Temperature °C. | Time (Minutes) | Percent Residual Solvent and Non-solvent | Flux | Separation Factor |
|---|---|---|---|---|---|
| 102 | 70 | 10 | *3 | 4.2 ± .2 | 7.3 ± .2 |
| 103 | 90 | 10 | 0 | 7.3 ± .3 | 5.8 ± .1 |
| 104 | 90 | 10 | *1 | 6.5 ± .3 | 5.9 ± .5 |
| 105 | 90 | 10 | *2 | 5.7 ± .2 | 6.3 ± .1 |

*Liquid bath has the described solvent percentages added thereto.

Examples 91–94, 95–98, 99–102, and 103–105, respectively, are prepared from the same melt pot run.

The gas permeability is affected by the conditions of the second liquid bath. Higher temperature and residence time result in higher gas permeability. Higher solvent content in the bath result in lowering the gas permeability significantly while the separation factor rise slightly.

EXAMPLES 106–111

Several hollow fiber membranes are prepared wherein the time period between the first bath and the second bath is varied. The fibers are tested for oxygen and nitrogen permeability. The results are compiled in Table 10.

TABLE 10
FIBER PROPERTIES RESULTING FROM DELAY BETWEEN THE TWO BATHS

| Example | Time Between Baths (Minutes) | $O_2$ Flux | Selectivity | Fiber Size (Microns) |
|---|---|---|---|---|
| 106 | 0 | 8.1 ± .1 | 6.0 ± .2 | 140 × 94 |
| 107 | 30 | 7.6 ± .3 | 6.7 ± .05 | 140 × 94 |
| 108 | 0 | 7.5 ± .1 | 5.6 ± .1 | 125 × 85 |
| 109 | 15 | 7.0 ± .1 | 6.1 ± .1 | 125 × 85 |
| 110 | 45 | 8.0 ± .3 | 6.7 ± .2 | 125 × 85 |
| 111 | 60 | 7.5 ± .1 | 6.0 ± .3 | 125 × 85 |

Examples 106–107 and 108–111, respectively, are from the same melt pot run.

Examples 106–111 demonstrate the fibers experience no deleterious effects due to longer times between the baths. In fact, the use of such a delay may be beneficial.

EXAMPLES 112–114

Two spin runs are performed wherein the fibers are dried right after removal from the second liquid bath. A third spin run is performed wherein the fibers are stored in water for 20 hours between the second bath and the drying step. The fibers are tested for oxygen and nitrogen permeability. The results are compiled in Table 11.

TABLE 11
EFFECT OF DELAY IN DRYING AFTER SECOND BATH

| Example | Water Storage Time (Hours) | Percent Solvent (In Second Bath) | Flux | Separation Factor |
|---|---|---|---|---|
| 112 | 0 | 0 | 5.1 ± .2 | 6.3 ± .3 |
| 113 | 0 | 2 | 1.3 ± .1 | 6.1 ± .1 |
| 114 | 20* | 0 | 7.3 ± .3 | 5.8 ± .1 |

EXAMPLES 115-124

Several hollow fibers are prepared with differing amounts of residual N-methylpyrrolidone (NMP) in the final fibers. The fibers are tested for oxygen and nitrogen permeability. The results are compiled in Table 12.

TABLE 12
EFFECT OF RESIDUAL SOLVENT IN THE FIBERS ON PERMEATION

| Example | Percent NMP | $O_2$ Flux | Selectivity | Fiber Size (Microns) |
|---|---|---|---|---|
| 115 | 0.76 | 7.0 ± .3 | 5.8 ± .4 | 140 × 94 |
| 116 | 3.70 | 1.0 ± .4 | 6.3 ± .4 | 204 × 147 |
| 117 | 1.06 | 3.9 ± .4 | 6.7 ± .1 | 158 × 106 |
| 118 | 0.41 | 4.7 ± .4 | 6.9 ± .1 | 112 × 74 |
| 119 | 0.35 | 6.9 ± .4 | 5.6 ± .4 | 112 × 74 |
| 120 | 1.80 | 4.9 ± .4 | 6.4 ± .4 | 140 × 94 |
| 121 | 1.54 | 5.0 ± .3 | 6.4 ± .3 | 140 × 94 |
| 122 | 1.20 | 7.0 ± .2 | 6.5 ± .1 | 140 × 94 |
| 123 | 1.03 | 7.4 ± .4 | 6.4 ± .1 | 140 × 94 |
| 124* | 1.14 | 4.8 ± .7 | 6.5 ± .1 | 140 × 94 |

*A third liquid bath at 20° C. is used with a residence time of two minutes.

The solvent content of the fiber prepared by the process correlates well with the intrinsic gas permeation rates of the fiber. As the residual solvent in the fiber increases the permeation rate decreases.

EXAMPLE 125

Tetrabromobisphenol A polycarbonate is tested for solubility in several solvents and non-solvents. Weighed amounts of polymer and liquid are placed in 4 dram-capacity glass vials with polyethylene-lined caps. About 2.5 grams of liquid is usually used. Initial polymer concentration is about 5 weight percent. The vials are placed on mechanical rollers for at least 24 hours or until complete solution is affected. Additional polymer, if indicated, is added to prepare concentrations of about 10, 25, and 50 weight percent. Insoluble mixtures with liquid boiling points in excess of about 100° C. are placed in a 100° C. forced-air oven for at least 24 hours' observation or until solution is completed. The polymer is arbitrarily designated as being "insoluble" in the liquid if 5 weight percent or less dissolved; "moderately" soluble if 5-25 percent dissolved; and "soluble" if more than 25 percent dissolved. The results are compiled in Table 13.

TABLE 13
SOLUBILITY OF TETRABROMOBISPHENOL A IN VARIOUS SOLVENTS

| Compound | Relative Solubility* |
|---|---|
| poly(dimethylsiloxane) 50 cs. | I<0.8% b f |
| perfluoro(methylcyclohexane) | I<1.4% b |
| hexane | I<1.6% b |
| triethylamine | I<4.7% b |
| butyl stearate | I<4.9% b f |
| methylcyclohexane | I<4.6% b f |
| dioctyl phthalate | I<4.7% b f |
| dodecane | I<4.7% b f |
| isopropylcyclohexane | I<4.95% b f |
| t-butylcyclohexane | I<4.9% b f |
| hexadecane | I<4.8% b f |
| diisopropyl ketone | I<4.9% b f |
| cyclohexane | I<4.8% b |
| bis(2-methoxyethyl ether) | S>50.3% b |
| ethyl benzoate | S>25.1<50.1% bcg@f |
| diethylene glycol dibutyl ether | I<4.9% b f |
| triethyl orthoformate | I<4.5% b f |
| methyl isobutyl ketone | I<4.7% b f c |
| tricresyl phosphate | I<5.0% b >5.0% f |
| methyl myristate | I<4.9% b f |
| triethylene glycol dimethylether | S>50.4% b |
| n-octyl acetate | S>50.1% b |
| dicyclohexyl | I<4.8% b f |
| methyl laurate | I<4.7% b f |
| tetraethylene glycol dimethylether | S>50.3% b |
| carbon tetrachloride | I<4.7% b |
| n-propylbenzene | I<4.9% b f c |
| methyl stearate | I—4.7% e f |
| piperidine | S>26.3% b f d |
| xylene | I<5.5% bc>5.5% f |
| decahydronaphthalene (cis & trans) | I<4.4% b f |
| ethylbenzene | I<4.9% b f c |
| diethyl ketone | S>50.2% b |
| toluene | I<4.5% b f c |
| N-ethylmorpholine | S>50.1% b |
| cyclohexyl acetate | S>50.5% b |
| butyraldehyde | I<4.8% b |
| tetrahydrofuran | S>51.4% b |
| ethyl acetate | I<4.7% b c |
| isophorone | S>25.3<50.1b>50.1f |
| cyclohexylbenzene | I<4.8% b f |
| trichloroethylene | S>50.2% b c |
| diacetone alcohol | I<4.9% b f |
| 1,2,4-trichlorobenzene | S>25.4<50.1bc?>50f |
| perchloroethylene | I<4.9% b f |
| chloroform | S>50.8% b c |
| methyl ethyl ketone | S>50.1% b c? |
| styrene | I<4.7% b c |
| ethyl formate | I<5.0% b c |
| benzaldehyde | S>50.1% b f |
| tetrahydronaphthalene | I<4.8% b f |
| chlorobenzene | S>50.4% b c g@f |
| methyl acetate | I<4.8% b c |
| methylene chloride | S>51.1% b c |
| acetone | I<4.6% b c |
| cyclohexanone | S>50.3% b |
| 1-cyclohexyl-2-pyrrolidinone | I<4.7% b >4.7% f |
| nitrobenzene | S>50.35% b c? g@f |
| p-dioxane | S>50.1% b |
| o-dichlorobenzene | S>50.1% b c g@f |
| epsilon-caprolactone | S>25.3<50.1b>50.1f |
| phenyl ether | S>50.1% e f c?@b |
| methyl formate | I<5.0% b |
| methyl iodide | S>50.2 b |
| cyclopentanone | S>50.3 b |
| hexamethylphosphoramide | I<4.9% b >4.9% f |
| methyl benzoate | S>50.5% b f c?@b |
| styrene oxide | S>50.5% b f c?@b&f |
| 1-ethyl-2-pyrrolidinone | S>50.1% b |
| acetophenone | S>50.1% b |
| methyl salicylate | S>25.6%<50.1b>50.1f |
| 1,1,3,3-tetramethylurea | S>50.3 b c g@f |
| 1-bromonaphthalene | S>25.3<50.0%bfc? |
| 1-hexanol | I<4.7% b f |
| dimethyl phthalate | I<4.9% b >4.9% f |

TABLE 13-continued
SOLUBILITY OF TETRABROMOBISPHENOL A IN VARIOUS SOLVENTS

| Compound | Relative Solubility* |
|---|---|
| pyridine | S>50.1% b |
| N,N-dimethyl-acetamide | S>50.2% b |
| propionitrile | I<4.9% b c |
| triethyl phosphate | I<4.8%bc?d?>4.8% f |
| dimethyl malonate | I<4.8% b f |
| polyethylene glycol E400 | I<2.2% b f |
| 1-acetyl-piperidine | S>50.1% b |
| 2-furaldehyde | S>50.1% b |
| N-methyl-pyrrolidinone | S>50.2% b |
| 1-benzyl-2-pyrrolidone | S>25.9<50.1b>50.1f |
| 2-propanol | I<2.9% b |
| 1-formyl-piperidine | S>50.1% b |
| diiodomethane | S>25.2% b f |
| acetonitrile | I<4.9% b |
| dimethyl-sulfoxide | M=>14.1% b f c |
| N,N-dimethyl-formamide | S>55.0% b |
| gamma-butyrolactone | S>50.2% b |
| ethanol | I<3.9% b |
| nitromethane | I<5.0% b f |
| N-formyl-morpholine | S>25.6<50.2b>50.2f |
| sulfolane | I<4.6% e >4.6% f |
| methanol | I<1.5% b |
| N-methyl-acetamide | I<4.6% e f |
| 2-pyrrolidinone | S>25.8<50.1b>50.1f |
| diethyl ether | I<4.6% b |
| ethylene glycol diethyl ether | I≦5.3 b c |
| ethylene glycol dimethyl ether | S>51.0% b |
| ethylene carbonate | I<5.0% e f |
| malonitrile | I<4.9% e f |
| N-methyl formamide | I<5.0% b f |

*I = Insoluble: <=5%; M = Moderately Soluble: 5-25%; S = soluble: >25; b = at room temperature; c = insoluble fraction and/or solvated polymer and/or solvent-induced order ?; d = reacts with polymer; e = at 50° C.; f = at 100° C.; g = clear.

The behavior of about 27 compounds are marked by a "c". Such behavior includes (a) partial dissolution followed by opacification and whitening of the clear swollen polymer accompanied by cessation of further dissolution; this behavior is frequently accompanied by a hazy or cloudy supernatant liquid; (b) dissolution to give a clear solution followed by precipitation at the same temperature or white and opaque solid, mushy gel-like formation, or, at the extreme, a solidification to a "candle wax-like" solid; and (c) dissolution at elevated temperature followed by precipitation of solid, "gelation", and/or a hazy-cloudy formation in the supernatant liquid upon cooling. Seven particularly severe cases of this behavior are noted. Methylene chloride solutions containing about 51% polymer become hard, candle wax-like solids after about 17 days' standing at room temperature. DMSO solutions containing about 14 percent polymer are readily formed at room temperature; they change to a white, opaque slush after about 36 hours. Redissolution does not occur at elevated temperature. Chloroform solutions containing about 51% polymer are clear at room temperature but change into candle wax-like solids after about 14 days. Chlorobenzene solutions containing about 50% polymer become clear stiff gels after about 11 days at room temperature. The gels become clear at 100° C. but become cloudy when cooled. Tetramethylurea containing about 50% polymer is clear and soluble at room temperature but becomes a rigid gel after about 8 days. The gel becomes clear at 100° C.; the clear solution becomes cloudy when cooled to room temperature. A clear solution of about 50% polymer in ethyl benzoate becomes a rigid, opaque gel after 11 days at room temperature. n-Propylbenzene dissolved less than 4.9% polymer at room temperature; solubility is almost complete at 100° C. The warm solution becomes a candle-like solid when cooled to room temperature.

Table 13 indicates several solvents and non-solvents which are good candidates for solvent non-solvent pairs useful for spinning polycarbonate membranes by the process disclosed herein.

EXAMPLES 126-129

Fibers are prepared using the same conditions as described in Example 1, with the exception that a polyethylene glycol with a molecular weight of 400 is used as the non-solvent, and the solvent non-solvent ratio is adjusted. Fibers are produced with a porous inner surface and a porous outer surface. After the fibers are prepared, the fibers are immersed in a solution of 25 percent by volume of methanol in water for two hours. The fibers are tested as described in Example 1 both before and after the immersion in the methanol and water solution, and the results are compiled in Table 14.

TABLE 14
Use of Polyethylene Glycol as a Non-solvent

| Example | Solvent Non-solvent Ratio | Oxygen Flux | Separation Factor | Oxygen Flux After Immersion | Separation Factor Immersion |
|---|---|---|---|---|---|
| 126 | 2.10 | 4.0 | 7.2 | 7.5 | 7.3 |
| 127 | 1.95 | 5.5 | 7.1 | 10.0 | 7.4 |
| 128 | 1.80 | 5.9 | 7.5 | | |
| 129 | 1.60 | 7.1 | 2.4 | | |

What is claimed is:

1. A composition useful for preparing a membrane comprising a tetrahalogenated bisphenol polycarbonate which comprises:

(A) a bisphenol polycarbonate wherein at least 25 percent by weight of the bisphenol moieties are tetrahalogenated wherein the halogen is chlorine or bromine which polycarbonate is polymerized to the extent that the polycarbonate will form a membrane with sufficient mechanical strength to withstand use conditions;

(B) a solvent for the polycarbonate which dissolves at least about 5 weight percent of the polycarbonate present at the membrane extrusion temperature and which comprises at least one compound selected from the group consisting of a glycol ether which corresponds to the formula $R^3O\text{-}(CH_2CH_2O)_r\text{-}R^3$ wherein $R^3$ is methyl or ethyl, and r is an integer of between about 1 and 20; morpholine substituted on the nitrogen atom with an alkyl, formyl, or alkanoyl moiety; an unsubstituted or N-$C_{1-4}$ alkyl, N-$C_{5-6}$ cycloalkyl, or N-$C_{6-10}$ aryl or alkaryl substituted pyrrolidinone; $C_{1-4}$ alkoxycarbonyl, formyl, nitro, or halo substituted benzene; dimethylformamide, cyclohexanone; N,N-dimethyl acetamide; acetophenone; sulfolane; cyclohexyl acetate; 1,1,3,3-tetramethylurea; isophorone; caprolactone; 1-formylpiperidine; methyl salicylate; hexamethylphosphoramide; phenyl ether; and bromonaphthalene; and (C) a non-solvent for the polycarbonate which dissolves less than about 5 weight percent of the polycarbonate present at the membrane extrusion temperature, which is soluble in the solvent for the polycarbonate, and which aids in the formation of pores, and which comprises at least one compound selected from the group consisting of a glycol or glycol ether which corresponds to the formula $R^4O$-$(CH_2CH_2O)_q$-$R^4$ wherein $R^4$ is separately in each occurrence hydrogen or $C_{1-4}$ alkyl, and q is an integer of about 1 to about 250; an ester corresponding to the formula $R^5COOR^6$ wherein $R^5$ is hydrogen or $C_{1-19}$ alkyl, and $R^6$ is $C_{1-10}$ alkyl; a $C_{1-10}$ alkanol; cyclohexane, unsubstituted or substituted with an alkyl, cycloalkyl, or perfluoroalkyl moiety; a $C_{5-20}$ alkane; a dialkyl ketone wherein at least one of the alkyl moieties is $C_3$ or greater; an amide corresponding to the formula $R^7CONHR^8$ wherein $R^7$ is hydrogen or $C_{1-10}$ alkyl and $R^8$ is $C_{1-10}$ alkyl; an acetyl or $C_{1-10}$ alkyl nitrile; acetone; a $C_{1-10}$ alkyl aldehyde; a trialkyl amine; nitromethane; trialkyl ortho-formate; diacetone alcohol; dimethyl malonate; decahydronaphthalene; tetrahydronaphthalene; malononitrile; ethylene carbonate; sulfolane; alkyl or cycloalkyl substituted benzene; and water;

wherein the composition is useful for the preparation by a wet extrusion process of a membrane which has one or more porous regions and one or more discriminating regions capable of separating one or more gases from one or more other gases.

2. The composition of claim 1 wherein the mixture has a sufficient viscosity to allow extrusion at temperatures at which the mixture is homogeneous.

3. The composition of claim 2 wherein the polycarbonate corresponds to the formula

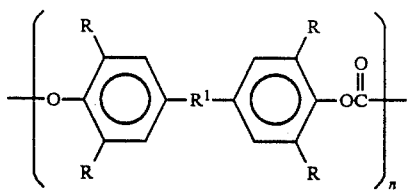

Formula I wherein R at each occurrence is independently H, Cl, Br, or $C_1$-$C_4$ alkyl; and, $R^1$ is carbonyl, —S—, —$SO_2$—, —O—, or a $C_1$-$C_6$ divalent hydrocarbon, a $C_1$-$C_6$ divalent halocarbon radical, or an inertly substituted $C_1$-$C_6$ hydrocarbon radical, with the proviso that at least 25 weight percent of the bisphenol moieties bear R groups which are exclusively Br or Cl.

4. The composition of claim 3 wherein the remainder of the R groups are hydrogen or $C_{1-4}$ alkyl, and $R^1$ is a $C_{1-6}$ divalent hydrocarbon.

5. The composition of claim 4 wherein the remainder of the R groups are hydrogen or methyl and $R^1$ is a $C_{1-6}$ alkylidine moiety.

6. The composition of claim 5 wherein at least 50 weight percent of the bisphenol moieties bear R groups which are exclusively Br or Cl.

7. The composition of claim 6 wherein 100 weight percent of the bisphenol moieties bear R groups which are exclusively Br or Cl.

8. The composition of claim 7 wherein at least 50 weight percent of the bisphenol moieties bear R groups which are exclusively Br.

9. The composition of claim 8 wherein 100 weight percent of the bisphenol moieties bear R groups which are exclusively bromine.

10. The composition of claim 9 wherein the bisphenol is tetrabromobisphenol A.

11. The composition of claim 7 wherein the mixture comprises between about 30 and about 60 percent by weight of polycarbonate and between about 40 and about 70 percent by weight of solvent and non-solvent wherein the weight ratio of solvent to non-solvent is between about 1.7 and 5.1.

12. The composition of claim 11 wherein
(A) the solvent for the polycarbonate comprises a compound selected from the group consisting of N-methyl pyrrolidinone, ethylene glycol dimethyl ether, N-ethyl morpholine, dimethyl formamide, cyclohexanone, bis(2-methoxyethyl ether), N,N-dimethyl acetamide, acetophenone, sulfolane, and mixtures thereof; and
(B) the non-solvent for the polycarbonate comprises a compound selected from the group consisting of 2-ethyoxyethanol, diethylene glycol dibutyl ether, polyethylene glycols with molecular weights of up to about 1450, dodecane, hexadecane, cyclohexane, methylcyclohexane, diisopropyl ketone, isopropyl ketone, isopropyl cyclohexane, t-butyl cyclohexane, N-methyl formamide, decaline, N-methyl acetamide, tetralin, dicyclohexyl, cyclohexyl benzene, water, and mixtures thereof.

13. The composition of claim 12 wherein the solvent non-solvent pair is N-methyl pyrrolidone and triethylene glycol, N-methyl pyrrolidone and a polyethylene glycol with molecular weight of up to about 1450, ethylene glycol dimethyl ether and water, ethylene glycol dimethyl ether and diisopropyl ketone, diethyl glycol dimethyl ether and water, acetophenone and diethylene glycol dibutyl ether, or acetophenone and hexadecane.

14. The composition of claim 13 wherein the solvent non-solvent pair is N-methyl pyrrolidone and triethylene glycol, or N-methyl pyrrolidone and a polyethylene glycol with molecular weight of up to about 400.

15. The composition of claim 11 wherein the mixture comprises between about 40 and about 60 percent by weight of polycarbonate and between about 40 and about 60 percent by weight of solvent and non-solvent wherein the weight ratio of solvent to non-solvent is between about 1.8 and about 2.7.

16. The composition of claim 15 wherein the mixture comprises between about 44 and about 56 percent by weight of polycarbonate and between about 44 and about 56 percent by weight of solvent and non-solvent wherein the weight ratio of solvent to non-solvent is between about 2.0 and about 2.4.

17. The composition of claim 1 which further comprises a solubilizing agent which functions as a dissolving medium for the polycarbonate, solvent, and non-solvent, which solubilizing agent aids in the formation of a homogeneous composition, which solubilizing agent possesses a boiling point lower than the membrane extrusion temperature and the boiling points of the solvent and non-solvent such that the solubilizing agent is substantially removed from the composition by flashing off prior to extrusion of the membrane.

18. The composition of claim 17 wherein the solubilizing agent comprises at least one compound selected from the group consisting of halogenated hydrocarbons, tetrahydrofuran, or alkyl ketones.

19. The composition of claim 18 wherein the solubilizing agent comprises at least one compound selected from the group consisting of methylene chloride, tetrahydrofuran, methyl ethyl ketone, methyl iodide, or chloroform.

20. The composition of claim 19 wherein the solubilizing agent comprises methylene chloride.

21. A composition useful for preparing a membrane comprising a tetrahalogenated bisphenol polycarbonate which comprises:
(A) a bisphenol polycarbonate wherein at least 25 percent by weight of the bisphenol moieties are tetrahalogentated wherein the halogen is chlorine or bromine, which polycarbonate is polymerized to the extent that the polycarbonate will form a membrane with sufficient mechanical strength to withstand use conditions;
(B) a solvent for the polycarbonate which dissolves at least about 5 weight percent of the polycarbonate present at the membrane extrusion temperature and which comprises at least one compound selected from the group consisting of an unsubstituted or N-$C_{1-4}$ alkyl, N-$C_{5-6}$ cycloalkyl, or N-$C_{6-10}$ aryl or alkaryl substituted pyrrolidinone; and
(C) a non-solvent for the polycarbonate which dissolves less than about 5 weight percent of the polycarbonate present at the membrane extrusion temperature, which is soluble in the solvent for the polycarbonate, and which aids in the formation of pores, and which comprises at least one compound selected from the group consisting of a glycol or glycol ether which corresponds to the formula $R^4O\text{-}(CH_2CH_2O)_q\text{-}R^4$ wherein $R^4$ is separately in each occurrence hydrogen or $C_{1-4}$ alkyl, and q is an integer of from about 1 to about 250;

wherein the composition is useful for the preparation by a wet extrusion process of a membrane which has one or more porous regions and one or more discriminating regions capable of separating one or more gases from one or more other gases.

22. The composition of claim 21 which further comprises a solubilizing agent which functions as a dissolving medium for the polycarbonate, solvent, and non-solvent, which solubilizing agent aids in the formation of a homogeneous composition, which solubilizing agent possesses a boiling point lower than the membrane extrusion temperature and the boiling points of the solvent and non-solvent such that the solubilizing agent is substantially removed from the composition by flashing off prior to extrusion of the membrane which comprises at least one halogenated hydrocarbon.

* * * * *

UNITED STATES PATENT AND TRADEMARK OFFICE
CERTIFICATE OF CORRECTION

PATENT NO. : 4,962,131
DATED : October 9, 1990
INVENTOR(S) : Henry N. Beck et al.

It is certified that error appears in the above-identified patent and that said Letters Patent is hereby corrected as shown below:

Col. 5, line 28, delete "suitable" and insert -- soluble --;

Col. 16, line 11, delete "stat-ed" and insert -- stated --;

Col. 16, line 56, delete "(0.68 inch)" and insert -- (0.068 inch) --;

Col. 19, line 30, in Table 4, under the subheading "Line Speed (Feet/Minute)" for example 41, delete "50" and insert -- $50^1$ --;

Col. 23, line 17, in Table 12, under the subheading "Fiber Size (Microns)", for example 118, delete "112 x 74" and insert -- 140 x 94 --;

Col. 24, line 23, in Table 13, under the subheading "Relative Solubility", for compound "methyl stearate", delete "I-4.7%" and insert -- $I<4.7\%$ --;

UNITED STATES PATENT AND TRADEMARK OFFICE
CERTIFICATE OF CORRECTION

PATENT NO. : 4,962,131

DATED : October 9, 1990

INVENTOR(S) : Henry N. Beck et al.

It is certified that error appears in the above-identified patent and that said Letters Patent is hereby corrected as shown below:

Col. 24, line 51, in Table 13, under the subheading "Relative Solubility", for compound "pyrrolidinone nitrobenzene", delete "50.35%" and insert -- 50.3% --;

Col. 25, line 54, delete "or white", and insert -- of white --.

Signed and Sealed this

Twenty-ninth Day of September, 1992

Attest:

DOUGLAS B. COMER

Attesting Officer

Acting Commissioner of Patents and Trademarks